(12) United States Patent
Mayhead et al.

(10) Patent No.: US 8,402,136 B1
(45) Date of Patent: Mar. 19, 2013

(54) METHODS AND APPARATUS FOR DISCOVERY DRIVEN PRODUCT REGISTRATION

(75) Inventors: Martin Paul Mayhead, Hindhead (GB); Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 760 days.

(21) Appl. No.: 11/956,894

(22) Filed: Dec. 14, 2007

(51) Int. Cl.
*G06F 15/16* (2006.01)
(52) U.S. Cl. ....................................................... 709/226
(58) Field of Classification Search .................. 709/226
See application file for complete search history.

(56) References Cited

U.S. PATENT DOCUMENTS

| 7,149,792 | B1 * | 12/2006 | Hansen et al. ............... 709/220 |
| 7,451,224 | B1 | 11/2008 | Stamler |
| 2003/0033387 | A1 | 2/2003 | Adams et al. |
| 2003/0195904 | A1 | 10/2003 | Chestnut et al. |
| 2004/0006688 | A1 | 1/2004 | Pike et al. |
| 2004/0143492 | A1 * | 7/2004 | Howell et al. ............... 705/14 |
| 2005/0044197 | A1 * | 2/2005 | Lai ............................ 709/223 |
| 2005/0261993 | A1 * | 11/2005 | Delivanis ..................... 705/28 |
| 2009/0235330 | A1 | 9/2009 | Byun et al. |

OTHER PUBLICATIONS

Office Action for U.S. Appl. No. 11/956,842 dated Nov. 24, 2010.
Office Action for U.S. Appl. No. 11/958,586 dated Jun. 23, 2010.
Notice of Allowance for U.S. Appl. No. 11/958,586 dated Dec. 10, 2010.
Final Office Action for U.S. Appl. No. 11/956,842 dated Jun. 9, 2011.

\* cited by examiner

*Primary Examiner* — Sulaiman Nooristany
(74) *Attorney, Agent, or Firm* — Brooks Kushman P.C.

(57) ABSTRACT

A system provides a registration client capable of querying a network to discover at least one asset existing on the network. The system receives, at the registration client, registration information from at least one asset. The registration client receives the registration information as a result of an interrogation of at least one asset. The system registers at least one asset using the registration information received from at least one asset. The registration client registers the asset.

20 Claims, 7 Drawing Sheets

---

206 RECEIVE, FROM THE AGENT, A RESPONSE TO THE QUERY, THE RESPONSE INCLUDING AT LEAST ONE SERVICE TAG ASSOCIATED WITH THE AT LEAST ONE ASSET

207 RECEIVE, FROM THE AGENT, A PLURALITY OF SERVICE TAGS ASSOCIATED WITH A PLURALITY OF ASSETS, THE PLURALITY OF SERVICE TAGS MAINTAINED BY THE AGENT

OR

208 RECEIVE FROM THE AGENT, ENVIRONMENT INFORMATION ASSOCIATED WITH THE AT LEAST ONE ASSET

OR

209 RECEIVE, FROM THE AGENT OPERATING ON A FIRST COMPUTER SYSTEM, THE AT LEAST ONE SERVICE TAG ASSOCIATED WITH AT LEAST ONE ASSET ASSOCIATED WITH A SECOND COMPUTER SYSTEM

OR

210 RECEIVE THE RESPONSE FROM THE AGENT, THE RESPONSE AVAILABLE TO A PLURALITY OF REGISTRATION CLIENTS

OR

211 RECEIVE AN ENCRYPTED RESPONSE WHEREIN THE RESPONSE IS ENCRYPTED DURING TRANSMISSION FROM THE AGENT TO THE REGISTRATION CLIENT

206 RECEIVE, FROM THE AGENT, A RESPONSE TO THE QUERY, THE RESPONSE INCLUDING AT LEAST ONE SERVICE TAG ASSOCIATED WITH THE AT LEAST ONE ASSET

> 207 RECEIVE, FROM THE AGENT, A PLURALITY OF SERVICE TAGS ASSOCIATED WITH A PLURALITY OF ASSETS, THE PLURALITY OF SERVICE TAGS MAINTAINED BY THE AGENT

OR

> 208 RECEIVE FROM THE AGENT, ENVIRONMENT INFORMATION ASSOCIATED WITH THE AT LEAST ONE ASSET

OR

> 209 RECEIVE, FROM THE AGENT OPERATING ON A FIRST COMPUTER SYSTEM, THE AT LEAST ONE SERVICE TAG ASSOCIATED WITH AT LEAST ONE ASSET ASSOCIATED WITH A SECOND COMPUTER SYSTEM

OR

> 210 RECEIVE THE RESPONSE FROM THE AGENT, THE RESPONSE AVAILABLE TO A PLURALITY OF REGISTRATION CLIENTS

OR

> 211 RECEIVE AN ENCRYPTED RESPONSE WHEREIN THE RESPONSE IS ENCRYPTED DURING TRANSMISSION FROM THE AGENT TO THE REGISTRATION CLIENT

*FIG. 5*

METHODS AND APPARATUS FOR DISCOVERY DRIVEN PRODUCT REGISTRATION

RELATION TO OTHER APPLICATIONS

This application relates to the following applications filed on the same date as the present application:

i) U.S. patent application Ser. No. 11/956,842, entitled "METHODS AND APPARATUS FOR MANAGING ASSETS USING SERVICE TAGS"

ii) U.S. patent application Ser. No. 11/958,586, now U.S. Pat. No. 7,987,269 issued Jul. 26, 2011, entitled "ADMINISTRATIVE GROUPING OF NETWORK RESOURCES"

The teachings and disclosure of the above co-filed applications are each incorporated by reference herein in their entirety.

BACKGROUND

Conventional technologies for product installation (i.e., software and/or hardware) typically give the user (performing the product installation) the opportunity to register the product. Registering a product provides benefits for both the user and the supplier of the product. The user may receive notices associated with the product, and product updates (for example, software updates) for the product. When users register products, the suppliers of the products gain insight into the client base using the products.

Typically, a user (such as the user performing the installation of the product) is assigned the task of registering the products. Each product is registered individually (i.e., each separate piece of hardware, each software package installed, etc.) During the installation and/or setup of product, the user is prompted to begin the registration task. The user typically fills information in data fields on a graphical user interface. The information supplied by the user may include information associated with the organization using the products, other hardware and/or software products that interface with the product being registered, etc. The information supplied by the user is then transmitted to the supplier of the product.

SUMMARY

Conventional technologies for registering products suffer from a variety of deficiencies. In particular, conventional technologies related to registering products are limited in that a user must first identify each product, and then individually register each product. For example, each server, storage disk, software package, etc., has its own registration process, and must be individually registered. This may be a tedious and time-consuming task. For example, registration processes typically ask the user to input the serial number of the product. In the case of a hardware product, the serial number is often hidden in the back of the product in a hard to reach area. In the case of a software product, the user has to find the printed sleeve accompanying the software CD in order to obtain the serial number. Often, the user performing the installation may not have a vested interest in registering the product, and may choose to simply install the product. Thus, the task of registering products is often not performed during the process of setting up/installing/deploying products.

Embodiments disclosed herein significantly overcome such deficiencies and provide a system that includes a computer system executing an automated asset registering process that queries a network to discover at least one asset (i.e., a hardware and/or software product). A registration client transmits a query throughout the network. In response, an agent wakes up and responds to the query by providing registration information associated with assets on the network. In an example embodiment, the registration information includes a service tag that is created by the agent. The service tag includes context information (for example, customer definable context) associated with the asset. Upon receiving the registration information from the agent, the registration client determines whether the asset requires registration (or, whether the asset has already been registered). If the asset requires registration, the registration client then registers the asset and transfers the registration information to a registration database. The automated asset registering process may register a plurality of assets on a network without interaction with a user. In other words, the automated asset registering process saves the user the tedious chore of registering each and every hardware and software product on the network.

However, if the user desires to have some visibility into (and control over) which products are registered, the automated asset registering process allows the user to have that control. In an example embodiment, the automated asset registering process provides a graphical user interface to a user, and displays a list of assets along with a registration status associated with each asset (i.e., whether the asset has been registered). The user may select one or more assets to register. The automated asset registering process then performs a batch registration process of the selected assets and transfers the registration information to a registration database. Thus, there is minimal effort on the part of the user to register multiple products, yet the user is informed which products are registered and what information associated with each product has been transferred to the registration database.

The automated asset registering process provides a registration client capable of querying a network to discover at least one asset existing on the network. The automated asset registering process receives (at the registration client) registration information from at least one asset. The registration client receives the registration information as a result of an interrogation of at least one asset. The automated asset registering process registers at least one asset using the registration information received from at least one asset. The registration client performs the registration process.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1, when the automated asset registering process receives, from the agent, a response from the query, the response including at least one service tag associated with at least one asset, according to one embodiment disclosed herein.

DETAILED DESCRIPTION

Embodiments disclosed herein include a computer system executing an automated asset registering process that provides a registration client capable of querying a network to discover at least one asset existing on the network. The automated asset registering processes registration information (at the registration client) from at least one asset (via an agent that collects the registration information from the asset, and transmits the registration information to the registration client). The automated asset registering process registers at least one asset using the registration information received from at least one asset. The registration client then performs the registration process.

Figure 1:
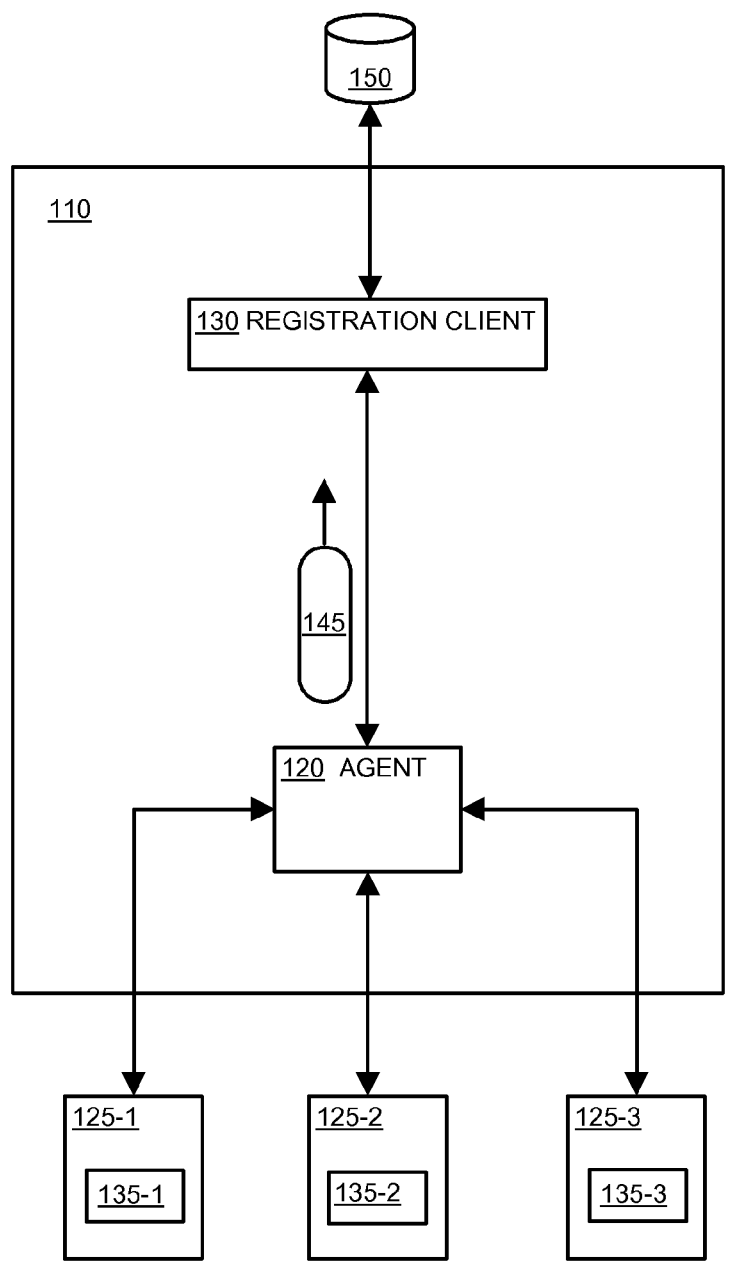
FIG. 1 is a block diagram according to one embodiment disclosed herein.

FIG. 1 illustrates a block diagram according to one embodiment disclosed herein. The automated asset registering process operates on a computer system 110 that includes a registration client 130 and an agent 120. The registration client 130 queries the network to discover assets 125-1, 125-2 and 125-3. An agent 120 responds to the registration client's 130 query, and provides registration information 145 (associated with the assets 125-1, 125-2 and 125-3) to the registration client 130. The agent 120 obtains the registration information 145 from the assets 125-1, 125-2 and 125-3. Included in the registration information 145 is a service tag 135-1, 135-2 and 135-3 associated with the respective asset 125-1, 125-2 and 125-3. The agent 120 creates the service tag 135-1, 135-2 and 135-3 for the respective asset 125-1, 125-2 and 125-3. The registration client 130 registers the assets 125-1, 125-2 and 125-3, and transmits registration information 145 to a registration database 150.

Figure 2:
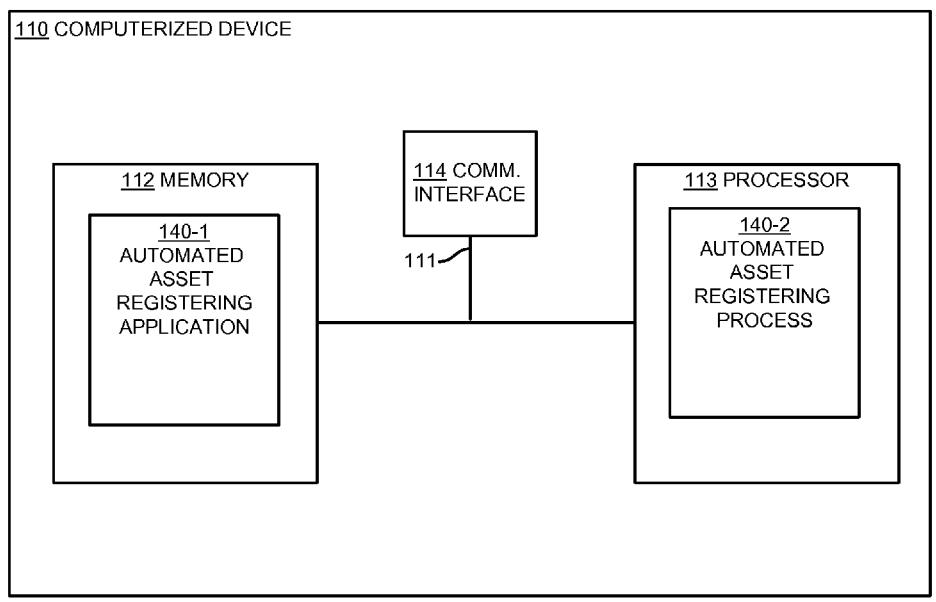
FIG. 2 shows a high-level block diagram of a computer system according to one embodiment disclosed herein.

FIG. 2 illustrates an example architecture of a computer system 110. The computer system 110 may be any type of computerized device such as a personal computer, workstation, portable computing device, console, laptop, network terminal or the like. In this example, the computer system 110 includes an interconnection mechanism 111 that couples a memory system 112, a processor 113, and a communications interface 114. The communications interface 114 enables the computer system 110 to communicate with other devices (i.e., other computers) on a network (not shown). This can allow access to automated asset registering application 140-1 by remote computer systems.

The memory system 112 may be any type of computer readable medium that is encoded with an automated asset registering application 140-1 that may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the automated asset registering application 140-1. Execution of the automated asset registering application 140-1 in this manner produces processing functionality in an automated asset registering process 140-2. In other words, the automated asset registering process 140-2 represents one or more portions of runtime instances of the automated asset registering application 140-1 (or the entire automated asset registering application 140-1) performing or executing within or upon the processor 113 in the computerized system 110 at runtime. It is to be understood that embodiments disclosed herein include the applications/software (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications/software operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the automated asset registering process 140-2.

Figure 3:
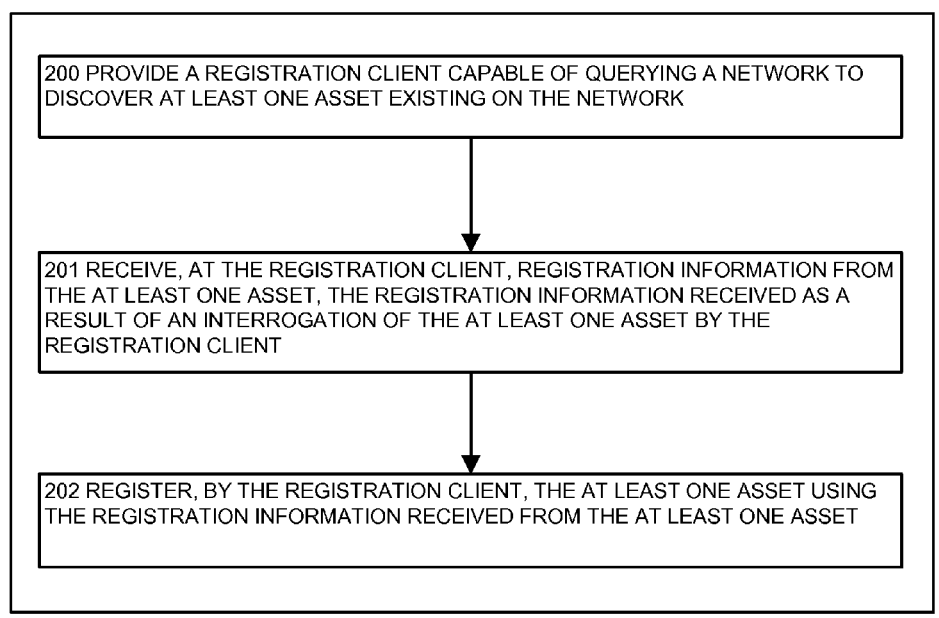
FIG. 3 illustrates a flowchart of a procedure performed by the system of FIG. 1, when the automated asset registering process provides a registration client capable of querying a network to discover at least one asset existing on the network, according to one embodiment disclosed herein.

FIG. 3 is an embodiment of the steps performed by the automated asset registering process 140-2 when it provides a registration client 130 capable of querying a network to discover at least one asset 125-1 existing on the network.

In step 200, the automated asset registering process 140-2 provides a registration client 130 capable of querying a network to discover at least one asset 125-1 existing on the network. In an example embodiment, a user has a network of assets 125-N including hardware, software, etc. Assets 125-N may include, for example, a computer system, an operating system installed on the computer system, and a plurality of software applications installed on the computer system. Each of the computer system, operating system and each software application is a separate asset 125-N. The user may download the registration client 130 onto the network so that the registration client 130 may discover all the assets 125-N existing on the network.

In step 201, the automated asset registering process 140-2 receives registration information 145 from at least one asset 125-1. The registration information 145 is received, by the registration client 130, as a result of an interrogation of at least one asset 125-1 by the registration client 130. The registration client 130 receives registration information 145 from the assets 125-N on the network and determines which of the assets 125-N require registration. For example, some of the assets 125-N may have already been registered, and therefore, do not need to be re-registered. In an example embodiment, an asset 125-1 may have been previously registered, and sold to a new user. Thus, that asset 125-1 requires re-registration such that the asset 125-1 is registered to the new user.

In step 202, the automated asset registering process 140-2 registers at least one asset 125-1 using the registration information 145 received from the asset 125-1. The registration client 130 registers the asset 125-1. In an example embodiment, the automated asset registering process 140-2 allows the user to determine when the registration client 130 registers the assets 125-N. The automated asset registering process 140-2 provides a graphical user interface to the user, allowing the user to determine which assets 125-N require registration. In another example embodiment, the user may run the registration client 130 on a closed network, and view which assets 125-N require registration. The user then determines which assets 125-N the user wishes to register, and connect to the Internet to transfer the registration information 145, associated with the assets 125-N, to a registration database 150. Thus, the automated asset registering process 140-2 provides the user with a measure of control over the security of the network. The user is able to view which assets 125-N are registered and what registration information 145 is collected (by the automated asset registering process 140-2) for each of the assets 125-N.

Figure 4:
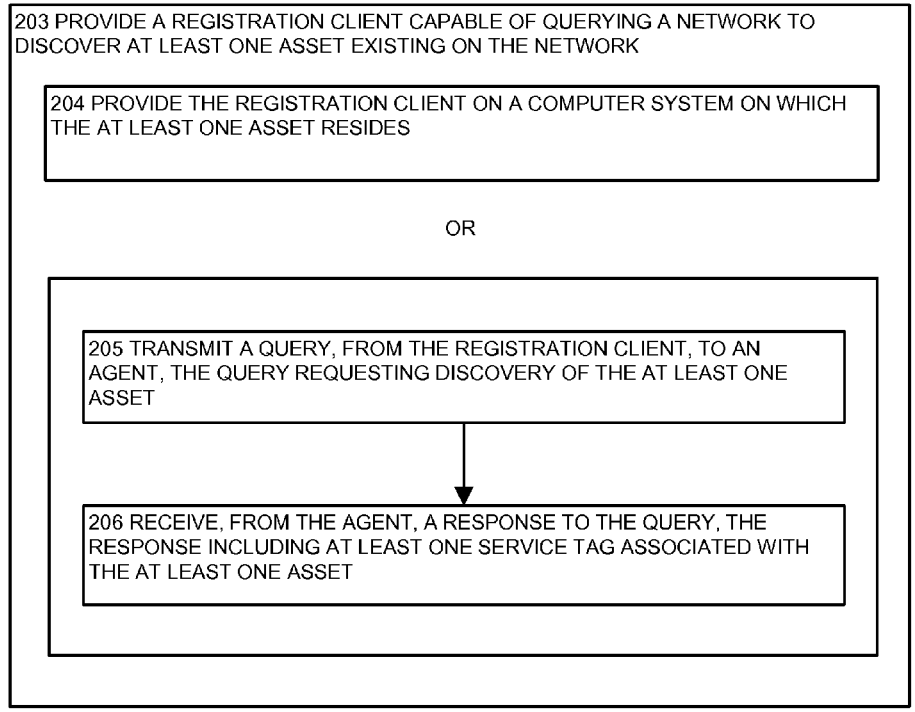
FIG. 4 illustrates a flowchart of a procedure performed by the system of FIG. 1, when the automated asset registering process provides a registration client capable of querying a network to discover at least one asset, and provides the registration client on a computer system on which at least one asset resides, according to one embodiment disclosed herein.

FIG. 4 is an embodiment of the steps performed by the automated asset registering process 140-2 when it provides a registration client 130 capable of querying a network to discover at least one asset 125-1 existing on the network.

In step 203, the automated asset registering process 140-2 provides a registration client 130 capable of querying a network to discover at least one asset 125-1 existing on the network. In an example embodiment, a user has a network of assets 125-N. The registration client 130 is downloaded onto the network to discover the assets 125-N existing on the network. Once the assets 125-N are discovered, the automated asset registering process 140-2 registers those assets 125-N that require registration. The user may download a plurality of registration clients 130 on the network.

In step 204, the automated asset registering process 140-2 provides the registration client 130 on a computer system on which at least one asset 125-1 resides. In an example embodiment, the registration client 130 may be downloaded on each computer system on which assets 125-N reside. The registration client 130 may discover the assets 125-N on that computer system. However, in another example embodiment, the registration client 130 may also discover assets 125-N existing on other computer systems on the network.

Alternatively, in step 205, the automated asset registering process 140-2 transmits a query, from the registration client 130, to an agent 120. The query requests discovery of at least one asset 125-1. The automated asset registering process 140-2 transmits the query (to discover assets 125-N existing on the network) to an agent 120. The agent 120 wakes up and responds to the query, providing registration information 145 associated with the assets 125-N on the network.

In step 206, the automated asset registering process 140-2 receives, from the agent 120, a response to the query. The response includes at least one service tag 135-N associated with at least one asset 125-1. The agent 120 discovers each asset 125-1 on the network, and creates a service tag 135-N for each asset 125-1. Upon receiving the query from the registration client 130, the agent 120 responds by transmitting registration information 145 associated with the asset 125-1 including a service tag 135-1 for each asset 125-1.

FIG. 5 is a continuation of FIG. 4 of an embodiment of the steps performed by the automated asset registering process 140-2 when it receives, from the agent 120, a response to the query.

In step 207, the automated asset registering process 140-2 receives, from the agent 120, a plurality of service tags 135-N associated with a plurality of assets 125-N. Each service tag 135-1 is associated with a respective asset 125-1. The agent 120 maintains the plurality of service tags 135-N. In an example embodiment, the agent 120 creates a service tag 135-1 for each asset 125-1 on the network. For example, the agent 120 creates a service tag 135-1 for each instance of a software application, meaning each time the software application is loaded on a computer system, a service tag 135-N is generated, by the agent 120, for that instance of the software application.

Alternatively, in step 208, the automated asset registering process 140-2 receives, from the agent 120, environment information associated with at least one asset 125-1. In an example embodiment, the environment information is a function of the state of the asset 125-1 environment at the time the service tag 135-1 is accessed. The agent 120 transfers the environment information to the registration client 130, along with the service tag 135-N.

Alternatively, in step 209, the automated asset registering process 140-2 receives, from the agent 120 operating on a first computer system, at least one service tag 135-N associated with at least one asset 125-2 associated with a second computer system. In other words, the agent 120 operating on one computer system may provide service tags 135-N (to the registration client 130) from assets 125-N existing on another computer system.

Alternatively, in step 210, the automated asset registering process 140-2 receives the response from the agent 120. The response is available to a plurality of registration clients 130. In an example embodiment, the user may download a plurality of registration clients 130 to a plurality of computer systems existing on the network. A single agent 120 may provide service tags 135-N to any of the registration clients 130 existing on the network. Thus, during the registration process, it is necessary for the registration client 130 to determine whether another registration client 130 has already registered the asset 125-1.

Alternatively, in step 211, the automated asset registering process 140-2 receives an encrypted response wherein the response is encrypted during transmission from the agent 120 to the registration client 130. In an example embodiment, the response provided from the agent 120 to the registration client 130 is encrypted during the transmission from the agent 120 to the registration client 130.

Figure 6:
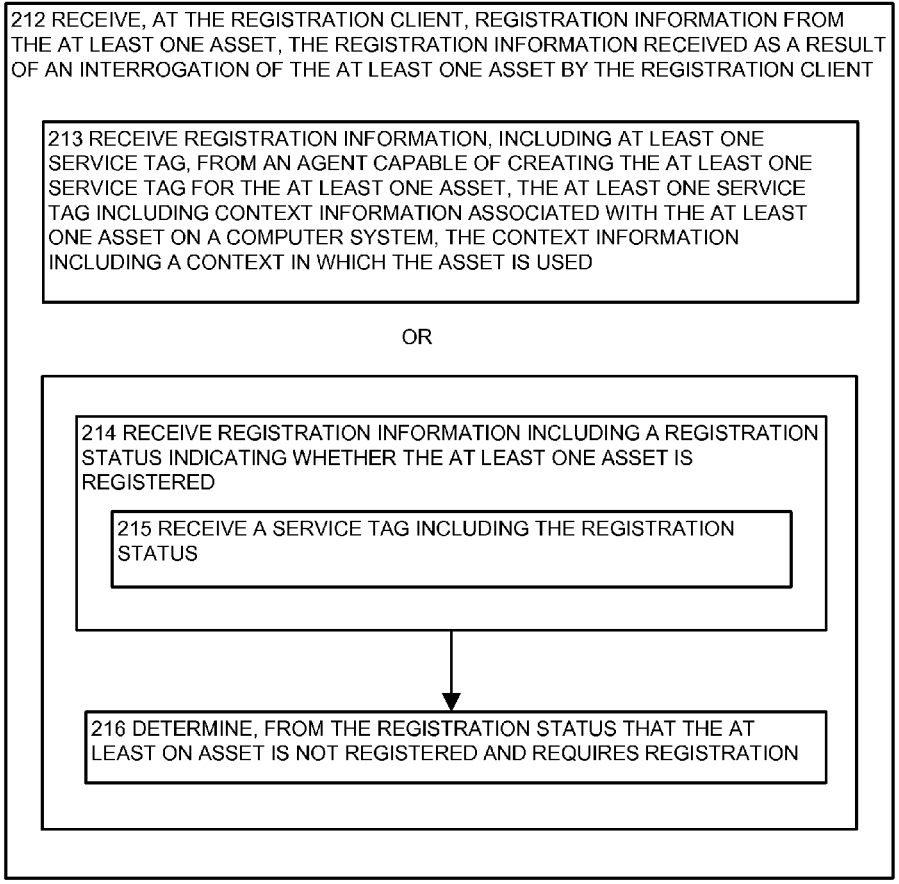
FIG. 6 illustrates a flowchart of a procedure performed by the system of FIG. 1, when the automated asset registering process receives, at the registration client, registration information from at least one asset, the registration information received as a result of an interrogation of at least one asset by the registration client, according to one embodiment disclosed herein.

FIG. 6 is an embodiment of the steps performed by the automated asset registering process 140-2 when it receives, at the registration client 130, registration information 145 from at least one asset 125-1.

In step 212, the automated asset registering process 140-2 receives, at the registration client 130, registration information 145 from at least one asset 125-1. The registration client 130 receives the registration information 145 as a result of an interrogation of at least one asset 125-1. The registration client 130 receives registration information 145, associated with at least one asset 125-1 from the agent 120. In an example embodiment, the agent 120 provides the registration information 145 to the registration client 130.

In step 213, the automated asset registering process 140-2 receives registration information 145, including at least one service tag 135-N, from an agent 120 capable of creating at least one service tag 135-N for at least one asset 125-1. The service tag 135-N includes context information associated with at least one asset 125-1 on a computer system. The context information includes a context in which the asset 125-1 is used. For example, the user may define the context in which the asset 125-1 is used in the network. The agent 120 creates a service tag 125-1 for each asset 125-1 on the network. The agent 120 transmits the service tag 125-1 information along with the registration information 145 to the registration client 130.

Alternatively, in step 214, the automated asset registering process 140-2 receives registration information 145, including a registration status, indicating whether the asset 125-1 is registered. The registration information 145 provided by the agent 120 also includes information indicating whether the asset 125-1 has already been registered. The registration client 130 uses the registration status to determine if the asset 125-1 has already been registered so as to avoid the duplicate effort of needlessly re-registering an already registered asset 125-1.

In step 215, the automated asset registering process 140-2 receives a service tag 135-N including the registration status. In an example embodiment, the registration status is included within the service tag 135-N provided by the agent 120 to the registration client 130.

In step 216, the automated asset registering process 140-2 determines, from the registration status, that at least on asset is not registered, and requires registration. The automated asset registering process 140-2 receives a registration status associated with each asset 125-1 on the network. If the asset 125-1 has not yet been registered, the automated asset registering process 140-2 begins the registration process for that asset 125-1. If the asset 125-1 has previously been registered, the automated asset registering process 140-2 determines that that particular asset 125-1 does not need to be registered. In an example embodiment, the asset 125-1 belonged to a previous user and ownership of the asset 125-1 was transferred to a new user. The automated asset registering process 140-2 determines that the asset now has a new user, and therefore is required to be re-registered to be associated with the new user.

Figure 7:
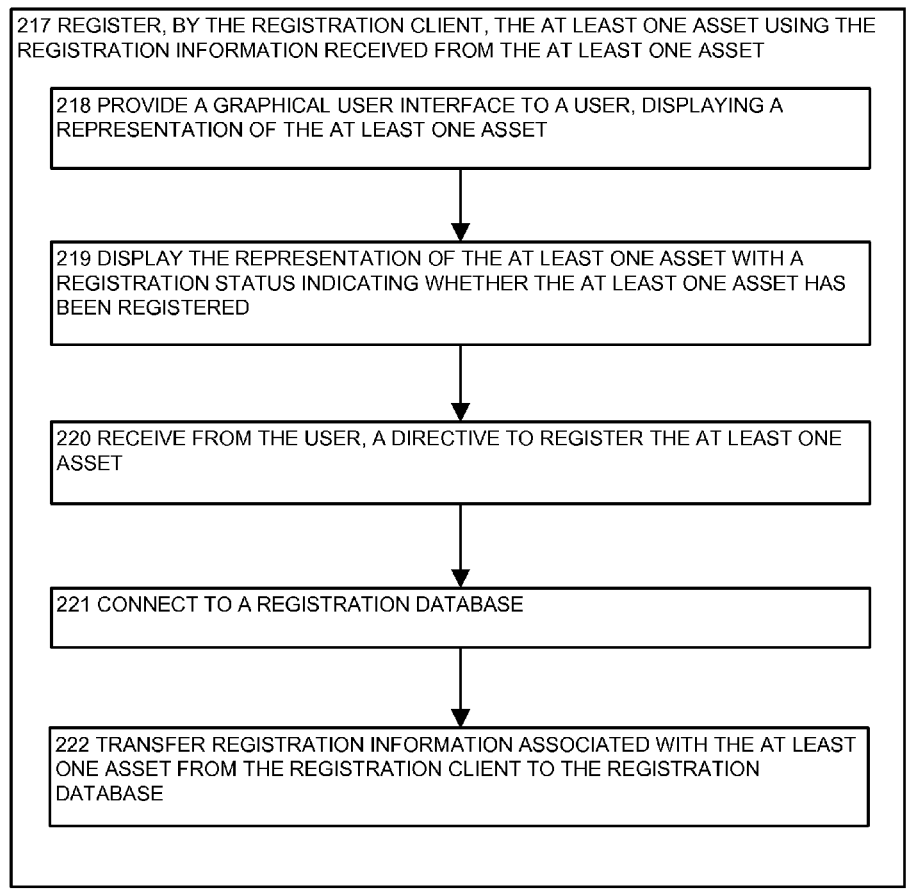
FIG. 7 illustrates a flowchart of a procedure performed by the system of FIG. 1, when the automated asset registering process registers (by the registration client) at least one asset using the registration information received from at least one asset according to one embodiment disclosed herein.

FIG. 7 is an embodiment of the steps performed by the automated asset registering process 140-2 when it registers at least one asset 125-1 using the registration information 145 received from at least one asset 125-1.

In step 217, the automated asset registering process 140-2 registers at least one asset 125-1 using the registration information 145 received from the asset 125-1. The registration client 130 registers the asset 125-1. The registration client 130 receives the registration information from the agent 120. The agent 120 transmits the service tag 135-1 along with the registration information 145. The automated asset registering process 140-2 connects to a registration database 150 to perform the registration process.

In step 218, the automated asset registering process 140-2 provides a graphical user interface to a user. The graphical user interface displays a representation of at least one asset. In an example embodiment, the automated asset registering process 140-2 provides a graphical user interface in which a user may view the assets 125-N on the network. Each asset 125-1 is identified on the graphical user interface, and additional information, such as whether the asset 125-1 has been registered, is also provided to the user. The automated asset registering process 140-2 provides registration information 145 associated with each asset 125-1, and allows the user to choose which asset 125-1 are to be registered.

In step 219, the automated asset registering process 140-2 displays the representation of at least one asset 125-1 with a registration status indicating whether the asset 125-1 has been registered. In an example embodiment, the asset 125-1 is displayed with a name that is recognizable to the user. For example, the service tag 135-N identifies the asset 125-1 with a unique identifier. This unique identifier may mean nothing to the user. The automated asset registering process 140-2 provides an identifier for the asset 125-1 that is recognizable to the user. For example, on a network, each computer system is typically given a name by which that computer system is referenced (i.e., "The system 'Demo-1' has just been rebooted"). Thus, within the graphical user interface, the asset 125-1 is identified by the user recognizable name. The automated asset registering process 140-2 displays the asset's 125-1 name, along with a registration status (i.e., 'registered' or 'not registered').

In step 220, the automated asset registering process 140-2 receives from the user, a directive to register at least one asset 125-1. Using the graphical user interface, the user selects which assets 125-N the user chooses to register. The automated asset registering process 140-2 then registers those assets 125-N in a batch process. The batch registering of the assets 125-N saves the user a substantial amount of time as opposed to individually registering each asset 125-1.

In step 221, the automated asset registering process 140-2 connects to a registration database 150. Upon completion of the registration process, the automated asset registering process 140-2 establishes a connection to a registration database 150. The registration database 150 may exist on a separate network. The registration database 150 may maintain registration information 145 associated with many networks associated with different users (i.e., clients of the assets 125-N). The registration database 150 may be associated with a supplier of the asset 125-1. By registering the asset 125-1, the supplier may provide the user with additional support and services associated with the asset 125-1. Likewise, the supplier may charge the user a premium for support and services if the user fails to register the asset 125-1. Hence, the user has an incentive to register the asset 125-1 and the automated asset registering process 140-2 facilitates that process for the user.

In step 222, the automated asset registering process 140-2 transfers registration information 145 associated with at least one asset 125-1 from the registration client 130 to the registration database 150. The registration information 145 is maintained within the registration database 150. Each time the asset 125-1 is updated, the agent 120 determines whether the update requires re-registration of the asset 125-1. Also, if ownership of the asset 125-1 changes hands (i.e., company A sells asset 125-1 to company B), the automated asset registering process 140-2 may contact the registration database 150 to determine that the asset 125-1 is now under new ownership and therefore, requires re-registration. For example, some assets may have already been registered, and therefore, do not need to be re-registered. In another example embodiment, an asset may have been previously registered, and sold to a new user. Thus, that asset requires re-registration such that the asset is registered to the new user.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of automating registration of assets via a network, the method comprising:
   providing a registration client for automatically querying a network to discover at least one asset existing on the network, the registration client comprising a software application and the at least one asset selected from a group including a hardware product and a software product, wherein providing a registration client comprises
   transmitting a query, from the registration client, to an agent, the query requesting discovery of the at least one asset, and
   receiving, from the agent, a response to the query, the response including at least one service tag associated with the at least one asset, wherein receiving comprises receiving, from the agent operating on a first computer system, the at least one service tag associated with at least one asset associated with a second computer system;
   receiving, at the registration client, registration information from the at least one asset, the registration information received as a result of an interrogation of the at least one asset by the registration client, the registration information including a registration status indicating whether the at least one asset is registered; and
   automatically registering, by the registration client, the at least one asset using the registration information received from the at least one asset if the registration status indicates that the at least one asset is not registered.

2. The method of claim 1 wherein receiving, from the agent, a response from the query, the response including at least one service tag associated with the at least one asset comprises:
   receiving, from the agent, a plurality of service tags associated with a plurality of assets, the plurality of service tags maintained by the agent.

3. The method of claim 1 wherein receiving, from the agent, a response from the query, the response including at least one service tag associated with the at least one asset comprises:
   receiving, from the agent, environment information associated with the at least one asset.

4. The method of claim 1 wherein receiving, from the agent, a response from the query, the response including at least one service tag associated with the at least one asset comprises:
   receiving the response from the agent, the response available to a plurality of registration clients.

5. The method of claim 1 wherein receiving, from the agent, a response from the query, the response including at least one service tag associated with the at least one asset comprises:
   receiving an encrypted response wherein the response is encrypted during transmission from the agent to the registration client.

6. The method of claim 1 wherein receiving, at the registration client, registration information from the at least one asset comprises:
   receiving registration information, including at least on service tag, from an agent capable of creating the at least one service tag for the at least one asset, the at least one service tag including context information associated with the at least one asset on a computer system, the context information including a context in which the asset is used.

7. The method of claim 1 wherein receiving, at the registration client, registration information from the at least one asset comprises:
   determining, from the registration status that the at least one asset is not registered and requires registration.

8. The method of claim 7 wherein receiving registration information including a registration status indicating whether the at least one asset is registered comprises:
   receiving a service tag including the registration status.

9. The method of claim 1 wherein automatically registering, by the registration client, the at least one asset using the registration information received from the at least one asset comprises:
   providing a graphical user interface to a user,
   displaying a representation of the at least one asset; and
   displaying the representation of the at least one asset with a registration status indicating whether the at least one asset has been registered.

10. The method of claim 9 comprising:
    receiving from the user, a directive to automatically register the at least one asset.

11. The method of claim 10 comprising:
    connecting to a registration database; and
    transferring registration information associated with the at least one asset from the registration client to the registration database.

12. A computerized device comprising:
    a memory;
    a processor;
    a communications interface;
    in interconnect mechanism coupling the memory, the processor and the communications interface;
    wherein the memory is encoded with an automated asset registering application that when executed on the processor is capable of registering assets on the computerized device by performing the operations of:
    providing a registration client for automatically querying a network to discover at least one asset existing on the network, the registration client comprising a software application and the at least one asset selected from a group including a hardware product and a software product, wherein providing a registration client comprises transmitting a query, from the registration client, to an agent, the query requesting discovery of the at least one asset, and receiving, from the agent, a response to the query, the response including at least one service tag associated with the at least one asset, wherein receiving comprises receiving, from the agent operating on a first computer system, the at least one service tag associated with at least one asset associated with a second computer system;

receiving, at the registration client, registration information from the at least one asset, the registration information received as a result of an interrogation of the at least one asset by the registration client, the registration information including a registration status indicating whether the at least one asset is registered; and automatically registering, by the registration client, the at least one asset using the registration information received from the at least one asset if the registration status indicates that the at least one asset is not registered.

13. The computerized device of claim 12 wherein when the computerized device performs the operation of receiving, at the registration client, registration information from the at least one asset, the computerized device performs the operation of:

receiving registration information, including at least on service tag, from an agent capable of creating the at least one service tag for the at least one asset, the at least one service tag including context information associated with the at least one asset on a computer system, the context information including a context in which the asset is used.

14. The computerized device of claim 12 wherein when the computerized device performs the operation of receiving, at the registration client, registration information from the at least one asset, the computerized device performs the operation of:

determining, from the registration status that the at least one asset is not registered and requires registration.

15. The computerized device of claim 12 wherein when the computerized device performs the operation of automatically registering, by the registration client, the at least one asset using the registration information received from the at least one asset, the computerized device performs the operation of:

providing a graphical user interface to a user, displaying a representation of the at least one asset; and displaying the representation of the at least one asset with a registration status indicating whether the at least one asset has been registered.

16. A non-transitory computer readable medium encoded with computer programming logic that when executed on a process in a computerized device provides automated asset registration, the medium comprising:

instructions for providing a registration client for automatically querying a network to discover at least one asset existing on the network, the registration client comprising a software application and the at least one asset selected from a group including a hardware product and a software product, wherein providing a registration client comprises transmitting a query, from the registration client, to an agent, the query requesting discovery of the at least one asset, and receiving, from the agent, a response to the query, the response including at least one service tag associated with the at least one asset, wherein receiving comprises receiving, from the agent operating on a first computer system, the at least one service tag associated with at least one asset associated with a second computer system;

instructions for receiving, at the registration client, registration information from the at least one asset, the registration information received as a result of an interrogation of the at least one asset by the registration client, the registration information including a registration status indicating whether the at least one asset is registered; and instructions for automatically registering, by the registration client, the at least one asset using the registration information received from the at least one asset if the registration status indicates that the at least one asset is not registered.

17. A method of automating registration of assets via a network, the method comprising:

providing a registration client for automatically querying a network to discover at least one asset existing on the network, the registration client comprising a software application and the at least one asset selected from a group including a hardware product and a software product, wherein providing a registration client comprises transmitting a query, from the registration client, to an agent, the query requesting discovery of the at least one asset, and receiving, from the agent, a response to the query, the response including at least one service tag associated with the at least one asset, wherein receiving comprises receiving, from the agent, a plurality of service tags associated with a plurality of assets, the plurality of service tags maintained by the agent;

receiving, at the registration client, registration information from the at least one asset, the registration information received as a result of an interrogation of the at least one asset by the registration client, the registration information including a registration status indicating whether the at least one asset is registered; and automatically registering, by the registration client, the at least one asset using the registration information received from the at least one asset if the registration status indicates that the at least one asset is not registered.

18. The method of claim 17 wherein providing a registration client for querying a network to discover at least one asset existing on the network comprises:

providing the registration client on a computer system on which the at least one asset resides.

19. The method of claim 17 wherein receiving, from the agent, a response from the query, the response including at least one service tag associated with the at least one asset comprises:

receiving, from the agent, environment information associated with the at least one asset.

20. The method of claim 17 wherein receiving, from the agent, a response from the query, the response including at least one service tag associated with the at least one asset comprises:

receiving the response from the agent, the response available to a plurality of registration clients.

* * * * *

UNITED STATES PATENT AND TRADEMARK OFFICE
CERTIFICATE OF CORRECTION

| | | |
|---|---|---|
| PATENT NO. | : 8,402,136 B1 | Page 1 of 1 |
| APPLICATION NO. | : 11/956894 | |
| DATED | : March 19, 2013 | |
| INVENTOR(S) | : Martin Mayhead et al. | |

It is certified that error appears in the above-identified patent and that said Letters Patent is hereby corrected as shown below:

In the Claims

Column 10, Line 20, Claim 6:

After "including at least"
Delete "on" and
Insert -- one --.

Column 10, Line 58, Claim 12:

After "a communications interface"
Delete "in" and
Insert -- an --.

Column 11, Line 30, Claim 13:

After "including at least"
Delete "on" and
Insert -- one --.

Signed and Sealed this
Sixteenth Day of July, 2013

Teresa Stanek Rea
*Acting Director of the United States Patent and Trademark Office*